United States Patent
Siegel (10) Patent No.: US 10,877,981 B1
(45) Date of Patent: *Dec. 29, 2020

(54) STOPWORD INCLUSION FOR SEARCHES

(71) Applicant: IMDB.com, Inc., Seattle, WA (US)

(72) Inventor: Hilliard Bruce Siegel, Seattle, WA (US)

(73) Assignee: IMDB.COM, INC., Seattle, WA (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/280,394

(22) Filed: Feb. 20, 2019

Related U.S. Application Data (63) Continuation of application No. 13/770,457, filed on Feb. 19, 2013, now Pat. No. 10,255,326.

(51) Int. Cl.
*G06F 16/2457* (2019.01)

(52) U.S. Cl.
CPC .............. *G06F 16/24578* (2019.01)

(58) Field of Classification Search
CPC ................................. G06F 16/24578
USPC ........................................................ 707/728
See application file for complete search history.

(56) References Cited

U.S. PATENT DOCUMENTS

| | | |
|---|---|---|
| 7,409,383 B1 | 8/2008 | Tong et al. |
| 8,392,435 B1 | 3/2013 | Yamauchi |
| 8,849,785 B1 * | 9/2014 | Shattuck ............. G06F 16/3325 707/706 |
| 9,009,146 B1 | 4/2015 | Lopatenko et al. |
| 2005/0216448 A1 | 9/2005 | Talib et al. |
| 2006/0230005 A1 | 10/2006 | Bailey et al. |
| 2009/0157652 A1 | 6/2009 | Barbosa et al. |
| 2011/0320444 A1 | 12/2011 | Yehaskel et al. |

\* cited by examiner

*Primary Examiner* — Michael Pham
(74) *Attorney, Agent, or Firm* — Thomas | Horstemeyer, LLP (57) ABSTRACT

Disclosed are various embodiments for providing search results that are generated by considering search terms that are typically ignored. A search query can be received from a client device. A search result is generated according to the search query and a weight assigned to a search term in the search query. The weight decreases as the quantity of search terms in the search query increase.

20 Claims, 5 Drawing Sheets

STOPWORD INCLUSION FOR SEARCHES

CROSS REFERENCE TO RELATED APPLICATIONS

This application claims priority to co-pending U.S. patent application entitled, "Stopword Inclusion of Searches," filed Feb. 19, 2013 and assigned application Ser. No. 13/770,457, which is incorporated herein by reference in its entirety.

BACKGROUND

With the intention and goal of providing efficient and reliable search results, search engines are programmed to filter common words, known as stopwords, when indexing a received search query prior to searching. By essentially ignoring the stopwords, the search engine saves time by not searching for words that are known to occur so frequently that if included would yield unreliable and unnecessary search results.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to considering search terms in a search query that are typically filtered out by search engines by applying a decay rate function based on the number of search terms in a search query. For the majority of searches, the inclusion of certain words, known as stopwords, can be burdensome, unnecessary, and yield unreliable search results. However, some types of searches benefit from the use of the stopwords in order to provide reliable search results. For example, media titles for movies, books, songs, and/or other types of media, typically are short and often contain words that are commonly referred to as stopwords. Due to the short length of media titles, the removal of such search terms for a search could yield inaccurate results that do not relate to the media title the user ultimately desired.

In various embodiments, a decay rate formula is applied to a received search query prior to processing a search result. If the received search query contains any words that match any of a predetermined set of stopwords, the search may consider, rather than ignore, the matching words when conducting the search according to the search query.

For example, for search queries comprising a small number of search terms, a stopword may be given a greater level of consideration when processing the search results. Alternatively, as the number of search terms increase in a received search query, the identified stopwords contained in the search query may be given a lower level of consideration, if any, when processing the search results of the larger search query.

Figure 1:
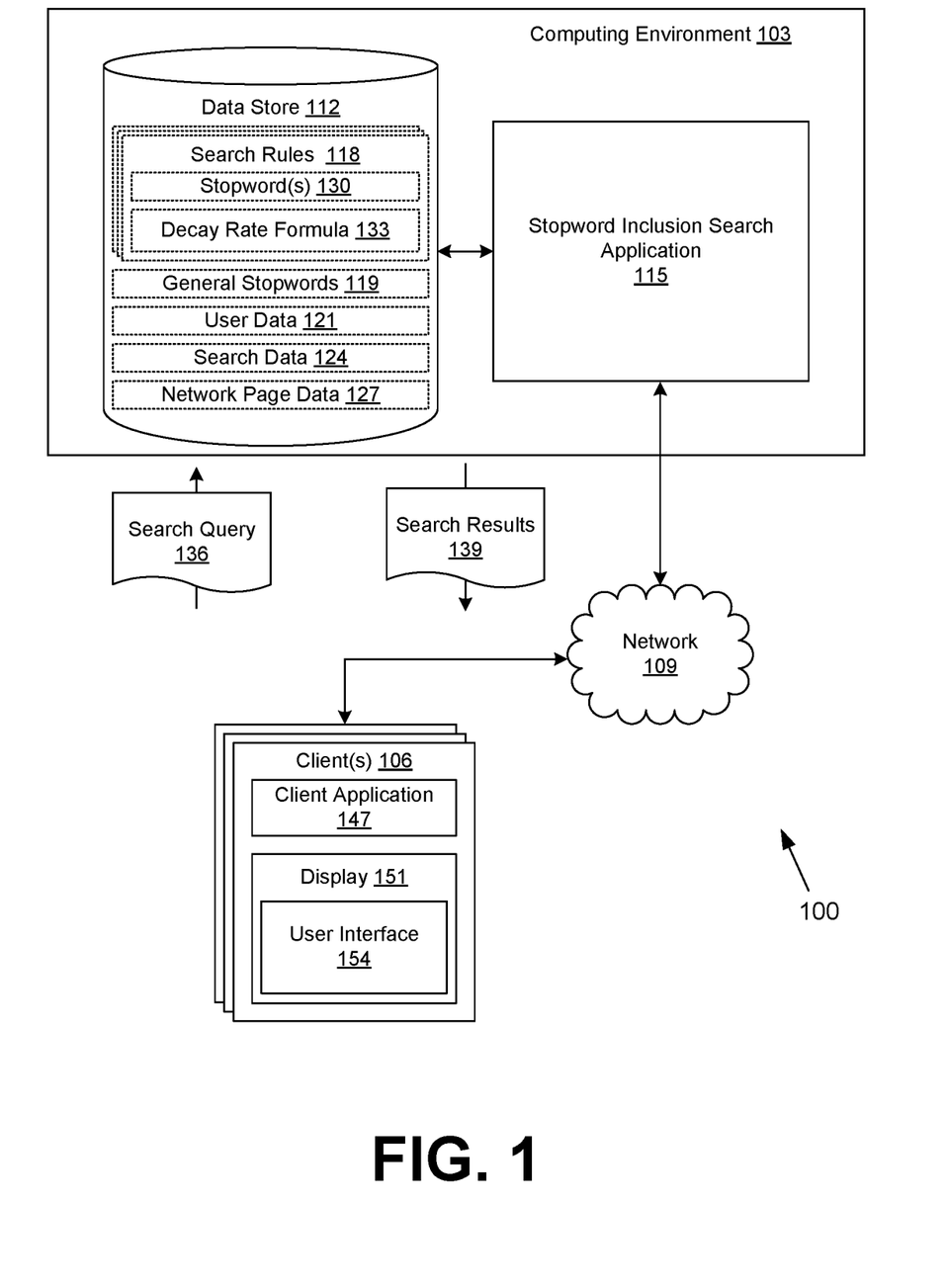
FIG. 1 is a drawing of a networked environment according to various embodiments of the present disclosure.

In the following discussion, a general description of the system and its components is provided, followed by a discussion of the operation of the same. With reference to FIG. 1, shown is a networked environment 100 according to various embodiments. The networked environment 100 includes a computing environment 103 and a plurality of clients 106 which are in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include the stopword inclusion search application 115 and other applications, services, processes, systems, engines, or functionality not discussed in detail herein. The stopword inclusion search application 115 is executed to provide search results 139 to a user based on a search query 136. Upon an evaluation of the received search query 136, the stopword inclusion search application 115 determines the appropriate set of rules to apply to the search with respect to the consideration of words that are usually ignored.

The data stored in the data store 112 includes, for example, search rules 118, general stopword(s) 119, user data 121, search data 124, network page data 127 and potentially other data. The search rules 118 provide a set of rules that are used to determine the level to which certain words are considered for a particular search. The search rules 118 may be associated with a particular search domain. The search domain may be an all-inclusive search or may be based on a particular category such as, for example, movies, audio, television, books, or other types of search categories. The search rules 118 may comprise a list of stopwords 130 and a decay rate formula 133. The list of stopwords 130 includes a list of words that that would typically be ignored during a standard search, but in the case of a search within a particular search domain may be specially considered by the stopword inclusion search application 115. The decay rate formula 133 is based on the quantity of search terms within the received search query 136, determines the appropriate consideration weight to apply to the stopwords 130 included in the received search query 136.

The general stopwords 119 may include a list of words that are generally considered stopwords. The general stopwords 119 is the list of words that would commonly be used by a search engine when determining what words to ignore or filter out in a search. The user data 121 may include user account, an interaction history, and/or other data related to specific users. The interaction history may include information specific to the user such as, for example, a purchase history, a browsing history, a view history, and/or other data that reflects a the prior interaction of the user with the computing environment 103. The search data 124 may comprise databases that can be searched in order to provide search results 139. The search data 124 may be associated with at least one search domain.

Network page data 127 may include images, text, code, graphics, audio, video, and/or other data relating to network pages served up by the stopword inclusion search application 115. To this end, network page data 127 may include static network pages or static elements of network pages, for example, in hypertext markup language (HTML), extensible markup language (XML), and/or any other language suitable for creating network pages. Further network page data 127 may include code that generates dynamic network pages when executed or interpreted in the computing environment 103. Such code may be written in any suitable programming language, such as PHP, Perl, Objective C, Java, Ruby, etc. Network page data 127 may also include code configured to be executed or interpreted within a client 106 in order to render a dynamic network page. Such code may be referred to as applets and may be written in any suitable programming language, such as Java Script, Java, etc.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 151. The display 151 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a client application 147 and/or other applications. The client application 147 may be executed in a client 106, for example, to access network content served up by the computing environment 103 and/or other servers, thereby rendering a user interface 154 on the display 151. The client application 147 may, for example, correspond to a browser, a mobile application, etc., and the user interface 154 may correspond to a network page, a mobile application screen, etc. The client 106 may be configured to execute applications beyond the client application 147 such as, for example, browsers, mobile applications, email applications, social networking applications, and/or other applications.

Next, a general description of the operation of the various components of the networked environment 100 is provided. To begin, a user may want to search for a particular item having a short title and/or name comprising common words, known as stopwords, which are typically filtered out or ignored by standard search engines. Stopwords in general typically comprise common words that are not indexed for searching due to their insignificance or commonality. For example, stopwords may include the words "a," "the," "it," "that," "at," "as," "to," and/or other common words. However, since some items have short titles or names that contain stopwords, the search engine should be capable of considering, rather than ignore, at least a set of a general list of stopwords, so that a search for those items having a short title and/or name become more reliable and focused on the actual item name and/or title. By using a set of search rules 118, the stopword inclusion search application 115 may conduct a search considering certain defined stopwords when appropriate. The set of search rules 118 may include a list of stopwords 130 and a decay rate formula 133 which is dependent on the number of words in a particular search query 136.

In some embodiments, the stopword inclusion search application 115 may generate a list of search rules 118 by creating a list of stopwords 130 and modifying, if needed, a decay rate formula 133. The set of search rules 118 corresponds with a particular search domain. For example, the stopword inclusion search application 115 may be able to do a general search of all accessible databases. While the stopword inclusion search application 115 may be able to access databases including information from a wide variety of categories, the stopword inclusion search application 115 may only have access to databases with limited categories, such as, for example, movies, songs, books, toys, tools, clothing, electronics, and/or any other type of category. Additionally, the stopword inclusion search application 115 may limit the search to only a portion of its accessible databases based at least in part on a particular search domain.

In order to generate a list of stopwords 130 specific to a search domain, the stopword inclusion search application 115 may access the corresponding databases and examine the titles of certain items, such as, consumer goods, movies, television shows, songs, books, and/or other types of items with titles and/or names. By examining the titles, the stopword inclusion search application 115 may generate a list of the frequency of identified stopwords within that particular search domain. In some embodiments, the examination of the databases may be limited to titles having a predefined number of words. For example, the stopword inclusion search application 115 may only examine titles that contain three or less words. Since longer titles may include more words that could be used to yield reliable search results 139, the consideration of stopwords may become unnecessary.

After determining the frequency of stopwords within the selection of titles examined, a portion of the most frequent stopwords may be included into the list of stopwords 130 associated with the set of rules corresponding to the particular search domain. In one non-limiting example, the stopword inclusion search application 115 may include the top ten most frequent words. Alternatively, the stopword inclusion search application 115 may include the top 50% of the most frequent words. In another non-limiting example, the stopword inclusion search application 115 may include all words that occur with at least a predefined minimum frequency, such as, for example, a word that occurs more than one thousand times. In another non-limiting example, the stopword inclusion search application 115 may only include one word from the list. Regardless of how the stopword inclusion search application 115 selects the word(s), the stopword inclusion search application 115 may include the selected words in the list of stopwords 130 for the corresponding set of search rules 118. In some embodiments, a list of stopwords 130 for a set of search rules 118 is not generated. Rather, the stopword inclusion search application 115 may use a general list of stopwords that is not specific to a particular search domain in the computing environment 103.

In another embodiment, the stopword inclusion search application 115 may receive a search query 136 entered by a user into a search box and generate search results 139 based at least in part upon the search query 136. The search may be based at least in part upon a particular search domain. This search domain may be identified by the user, limited by the actual search query 136, or determined by the stopword inclusion search application 115.

Figure 2:
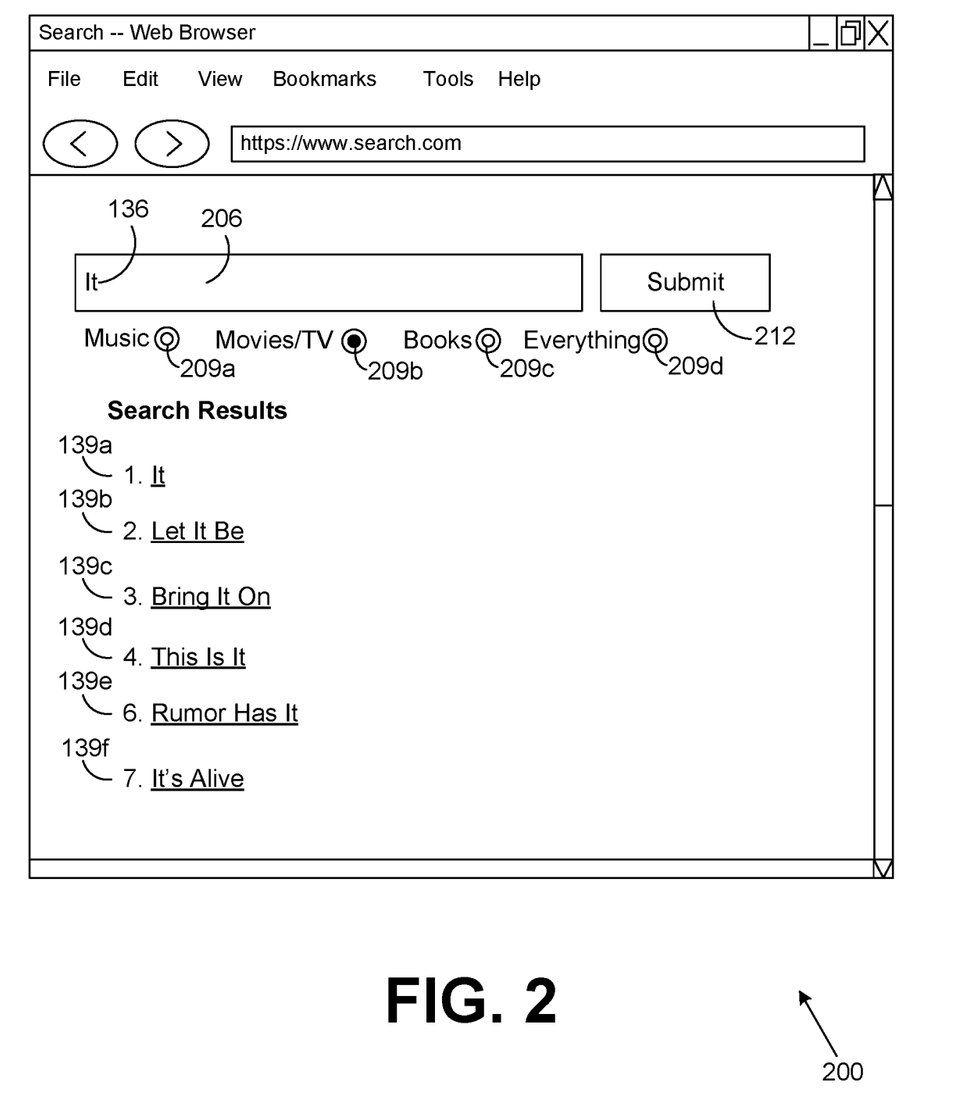
FIG. 2 is a drawing of an example of a user interface rendered by a client in the networked environment of FIG. 1 according to various embodiments of the present disclosure.

For example, the user may be able to select a particular search domain. As shown in FIG. 2, the user may be able to limit the search to a particular category. Alternatively, the stopword inclusion search application 115 may be limited to a particular domain. For example, the stopword inclusion search application 115 may have access only to the search domain corresponding to books. In another example, the stopword inclusion search application 115 may be able to determine the appropriate search domain. For example, if the search query 136 includes specific words that relate to a particular search domain, the stopword inclusion search application 115 may be able to determine the appropriate search domain. Regardless of how the search domain is determined, the stopword inclusion search application 115 may be able to select an appropriate set of search rules 118 to apply when conducting the search.

In another embodiment, if the search domain is broad and not limited to a particular category, the stopword inclusion search application 115 may employ a set of search rules 118 that corresponds to a more limited search domain. In one non-limiting example, the stopword inclusion search application 115 may consider an interaction history from the user data 121 to determine areas of interest by a user. For example, the stopword inclusion search application 115 may determine using the purchase and/or browsing history of the user that the user is interested in movies. Therefore, although the search domain for the particular search may be broader than merely movies, the stopword inclusion search application 115 may use the set of search rules 118 associated with the search domain for movies. Therefore, assuming the search by the user likely involves movies, the search performed by the stopword inclusion search application 115 would be made more reliable by possibly stopwords within the search query 136.

In another embodiment, when the stopword inclusion search application 115 receives the search query 136 entered by the user, the stopword inclusion search application 115 determines whether any of the search terms within the search query 136 are identified as stopwords based on a set of search rules 118. The set of search rules 118 may be specific to a general search domain or a limited search domain. If the set of search rules 118 contains a list of stopwords 130, the stopword inclusion search application 115 may compare the search terms from the search query 136 to the list of stopwords 130 to determine if any of the search terms may be identified as stopwords that should be considered. It should be noted that if some of the search terms within the search query 136 do not match any of the words in the list of stopwords 130 associated with the set of search rules 118, but do match the general stopwords 119, those search terms would be ignored and not considered in the search.

Alternatively, if the set of search rules 118 does not include a list of stopwords 130, the stopword inclusion search application 115 may use a list of general stopwords 119 to identify search terms within the received search query 136 that may be considered a stopword. The search terms that are identified as stopwords, either from the list of stopwords 130 corresponding to a set of search rules 118 or if applicable the general stopwords 119 may be assigned a consideration weight based on the decay rate formula 133 included in the set of search rules 118.

In another embodiment, the stopword inclusion search application 115 uses a decay rate formula 133 that may be specific to a set of search rules 118. The decay rate formula 133 is used to determine an appropriate consideration weight to assign identified stopwords from the received search query 136. The consideration weight may be a percentage, such as, for example, 70%, an integer, a fraction, or any other value that can be used to determine a level of consideration. The decay rate formula 133 considers the quantity of search terms in a search query 136. According to the decay rate formula 133, the consideration weight will decrease as the quantity of stopwords increases.

For example, if the search query 136 contains only one search term and that search term has been identified as a stopword, that search term will be given full consideration. For example, the consideration weight is given a value of 100% or 1. Alternatively, if the search query 136 contains three words and at least one of the words has been identified as a stopword, the consideration weight might decrease. For example, the consideration weight might decrease to a value of 60% or 0.6. However, while the consideration weight might decrease, the search term may still be considered in the search but will not be considered as important as another search term not identified as a stopword. As the quantity of search terms increases, the consideration weight will decrease until the search term identified as a stopword is no longer considered, and therefore ignored during the search. For example, the consideration weight may be given a value of 0% or 0.

Once the identified stopword(s) from the received search query 136 are assigned a consideration weight, the stopword inclusion search application 115 may perform a search and subsequently generate search results 139 based on the search terms and the weighted values assigned to search terms identified as stopwords.

With reference now to FIG. 2, shown is a drawing of an example of a user interface rendered by a client 106 (FIG. 1) in the networked environment 100 (FIG. 1) according to various embodiments of the present disclosure. In particular, FIG. 2 depicts an example of a results view 200 rendered by a client application 147 executed by the client 106. The results view 200 depicts a portion of the search results 139a, 139b, 139c, 139d, 139e, and 139f generated using the search query 136 entered by the user into the search box 206 and submitted by the user by selecting the submit button 212. The results view 200 may include search domain buttons 209a, 209b, 209c, and 209d that a user can select to specify a specific search domain to be used for an additional search and/or other information and/or controls relevant to displaying the results of the search and/or facilitating an additional search.

Figure 3:
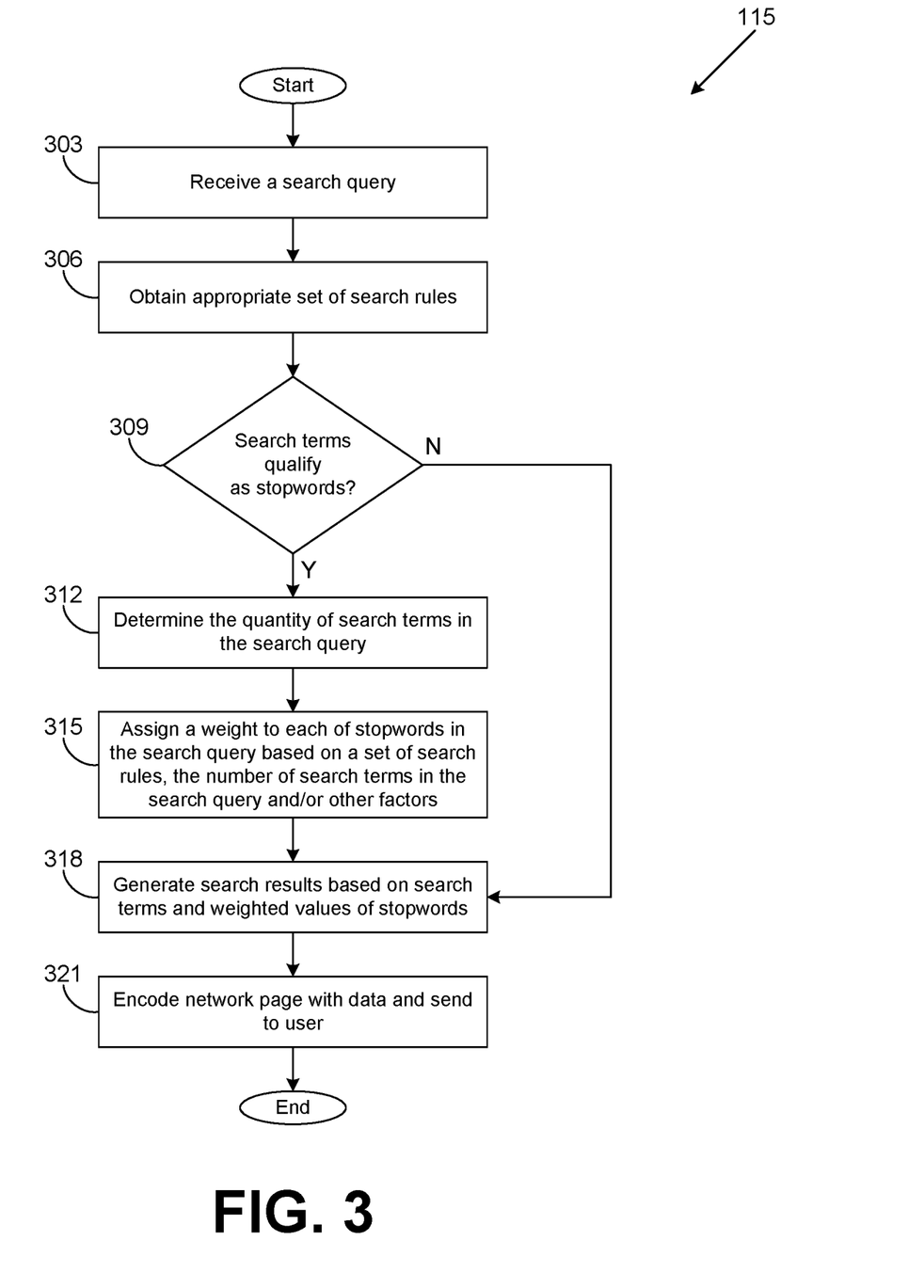
FIGS. 3-4 are flowcharts illustrating examples of functionality implemented as portions of the stopword inclusion search application executed in a computing environment in the networked environment of FIG. 1 according to various embodiments of the present disclosure.

Turning now to FIG. 3, shown is a flowchart that provides one example of the operation of a portion of the stopword inclusion search application 115 according to various embodiments. It is understood that the flowchart of FIG. 3 provides merely an example of the many different types of functional arrangements that may be employed to implement the operation of the portion of the stopword inclusion search application 115 as described herein. As an alternative, the flowchart of FIG. 3 may be viewed as depicting an example of steps of a method implemented in the computing environment 103 (FIG. 1) according to one or more embodiments.

Specifically, FIG. 3 provides an example of the functionality that may be performed when processing a search based on a received search query 136 (FIG. 1). The example in FIG. 3. relates to evaluating a received search query 136, and based on a set of search rules 118 (FIG. 1) determining a consideration weight that reflects the level of consideration that the search will give to the search terms that are determined to be stopwords.

Beginning with box 303, the stopword inclusion search application 115 (FIG. 1) receives a search query 136 entered by a user in a search box on a network page served up by the stopword inclusion search application 115 and rendered on a client 106 (FIG. 1). In some non-limiting examples, the user may also select a particular search domain relevant to the search. While the search domain may be specific to the actual network page and may be all-inclusive for a wide variety of search databases, the search domain may also be very specific. For example, if the user wants their search to be limited to movies, the stopword inclusion search application 115 may receive the selection related to movies to reflect the desired search domain. After receiving the search query 136, the stopword inclusion search application 115 proceeds to box 306.

In box 306, the stopword inclusion search application 115 obtains the appropriate set of search rules 118 to be used in processing the search associated with the received search query 136. Each set of search rules 118 may be associated with a particular search domain. While a certain search domain may include an all-inclusive search of accessible databases, the search domain may also be limited to a particular category as discussed with respect to box 303.

For example, if the search domain is limited to the category of movies, the set of search rules 118 obtained from the data store 112 would be those that correspond to movies. Accordingly, the stopwords 130 associated with the obtained search rules 118 may be limited to only those words that are deemed relevant with respect to movies. Additionally, the decay rate formula 133 may be specific to movies.

In another non-limiting example, the set of search rules 118 obtained by the stopword inclusion search application 115 may be based on an interaction history of a user. Even if the general search domain is based on an all-inclusive search, the stopword inclusion search application 115 may use the interaction history to choose a set of search rules 118 that may be associated with a more limited search domain. For example, if an interaction history, such as, for example, a purchasing history, shows that the user repeatedly purchases books within a predefined period of time reflecting a great interest in books, there is a greater probability that the user would be searching for books even if the search page is for a general all-inclusive search domain. As such, the stopword inclusion search application 115 may select the set of search rules 118 associated with a search domain related to books rather than the set of search rules 118 associated with an all-inclusive search. Upon obtaining an appropriate set of search rules 118 to use when processing a search request, the stopword inclusion search application 115 proceeds to box 309.

In box 309, the stopword inclusion search application 115, determines if any of the search terms in the received search query 136 qualify as stopwords 130. The stopwords 130 may be defined and included in the set of search rules 118, or may be based on a universal set of stopwords that are frequently ignored by standard search engines. If the set of search rules 118 includes a list of stopwords 130, those words are used when comparing each search term in the received search query 136. Likewise, if the set of search rules 118 does not include a list of stopwords 130, a generic, universal set of stopwords may be used.

The stopword inclusion search application 115 may compare each search term from the received search query 136 with the stopwords 130 to determine if there is a match. If a match is detected, the stopword inclusion search application 115 proceeds to box 312. If a match is not detected, the stopword inclusion search application 115 proceeds to box 318 to begin processing the requested search.

In box 312, the stopword inclusion search application 115 determines the quantity of search terms in the search query 136. Since the decay rate formula 133 depends on the number of search terms in the search query 136, the stopword inclusion search application 115 must determine the total number of search terms within the search query 136. For example, if the search query 136 is "Once Upon a Time," the quantity of search terms will be four. Upon determining the quantity of search terms in the received search query 136, the stopword inclusion search application 115 proceeds to box 315.

In box 315, the stopword inclusion search application 115 assigns a consideration weight to each of the search terms that match a stopword 130 based on the decay rate formula 133. In one non-limiting example, each search term that is determined to be a stopword 130 is given a consideration weight based on the total quantity of search terms in the search query 136. For example, the consideration weight may be based on a rate of 0-100%, where 0% may indicate that there is to be no consideration for the particular word, and 100% may indicate that the search term is to be given the same weight as all other non-stopword search terms.

For example, for quantities of search terms in between 1-10, the rate of 0-100% may be applied and the appropriate weight would be interpolated. If a search query 136 only contains one search term and that search term matches one of the stopwords 130, then the one search term will be considered during the search and will be given a 100% consideration. Alternatively, if the search query 136 contains ten words, the search terms that are considered stopwords 130 would be given 0% consideration and would be ignored during the search. Additionally, search queries containing 2-3 words would give a higher consideration rate to the stopwords 130 than search queries containing 8-9 words. While the consideration weight discussed in this example is based on a percentage, the consideration weight may be based on any other type of constant that could reflect a type of decay in importance and/or relevance.

In another non-limiting example, assume the received search query 136 is "It Must Be," and the search domain is associated with songs. The set of search rules 118 may include the stopwords {"it," "be," "the"}. Since the received search query 136 includes the words "it" and "be," the words will be assigned a relative weight. Since the search query 136 includes three words, the decay rate formula 133 may determine that the words "it" and "be" be considered with a consideration weight of 0.7. Therefore, instead of ignoring "it" and "be" altogether, the terms will be considered using the appropriate assigned consideration weight. Upon assigning the appropriate consideration weight to the search terms in the received search query 136 that are identified as stopwords 130, the stopword inclusion search application 115 proceeds to box 318.

In box 318, the stopword inclusion search application 115 generates search results 139 based on the search terms and the weighted values of the search terms identified as stopwords 130. As such, the stopword inclusion search application 115 operates as a normal search engine in order to provide accurate and reliable results. However, unlike normal search engines, the stopword inclusion search application 115 considers words identified as stopwords 130 based on an assigned weight. For example, using the same search query 136 ("It Must Be") as above, the terms "it" and "be" may be given 70% consideration, while "must" would be given 100% consideration.

It should also be noted that if the set of search rules 118 includes a list of stopwords 130, and the search query 136 includes general stopwords 119 that are not included in the list of stopwords 130 from the set of search rules 118, those search terms not included would not be considered and would be treated as if they had a consideration weight of 0. Upon generating search results 139 based on the search terms and weighted values of those search terms identified as stopwords 130, the stopword inclusion search application 115 proceeds to box 321.

In box 321, the stopword inclusion search application 115 encodes a network page with the search results 139 and sends the network page to the user over the network 109. The network page will be displayed to the user on a user interface 154 rendered on the client 106. Upon encoding the network page with the search results 139 and sending to the user, the portion of the stopword inclusion search application 115 ends.

Figure 4:
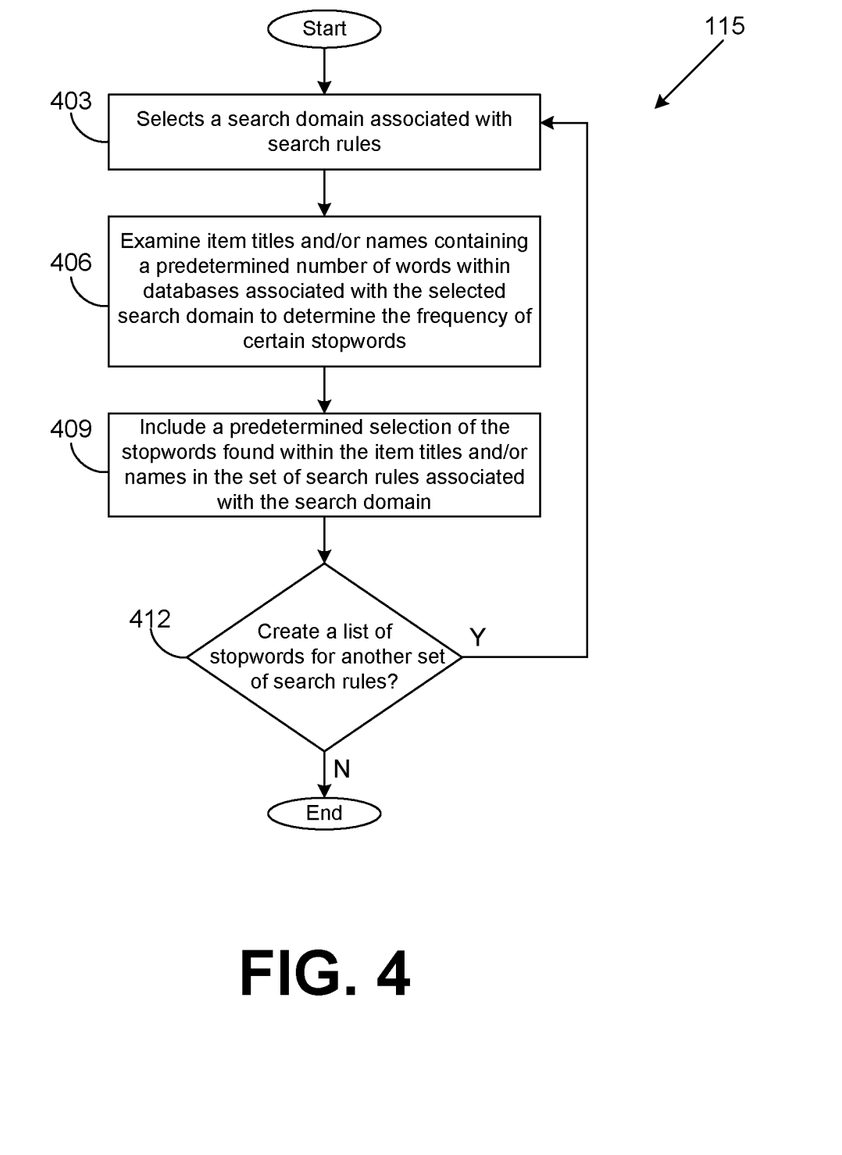

Moving on to FIG. 4, shown is a flowchart that provides one example of the operation of a portion of the stopword inclusion search application 115 according to various embodiments. It is understood that the flowchart of FIG. 4 provides merely an example of the many different types of functional arrangements that may be employed to implement the operation of the portion of the stopword inclusion search application 115 as described herein. As an alternative, the flowchart of FIG. 4 may be viewed as depicting an example of steps of a method implemented in the computing environment 103 (FIG. 1) according to one or more embodiments.

FIG. 4 provides an example of the functionality in populating the set of search rules 118 associated with various search domains with one or more stopwords 130. While there may be a general set of words that are frequently ignored by standard search engines, each set of search rules 118 may include one or more stopwords 130 specific to the search domain.

Beginning with box 403, the stopword inclusion search application 115 (FIG. 1) selects a search domain associated with a specific set of search rules 118 (FIG. 1). As previously discussed, a search may be based at least in part upon an all-inclusive search on all accessible databases, or may be limited to a specific category. Each set of search rules 118 corresponds to a particular search domain. Upon selecting a search domain, the stopword inclusion search application 115 proceeds to box 406.

In box 406, the stopword inclusion search application 115 examines the item names and/or titles having a predetermined number of words within the databases associated with the selected search domain to determine the frequency of general stopwords 119 (FIG. 1). In some embodiments, the predetermined number of words may be based on a variety of factors that may include average length of item title and/or names, type of search domain, and/or other factor that may substantiate limiting the search. For example, the stopword inclusion search application 115, may only examine items containing 1-3 words in the item title and/or names. It could be assumed that item titles and/or names with fewer words are likely to contain common words that the exclusion of may affect the reliability of the final search results 139 (FIG. 1). However, the predetermined number of words may also be an infinite number of words, essentially allowing the stopword inclusion search application 115 to examine every item title and/or name in the corresponding databases.

In examining the items, the stopword inclusion search application 115 examines the item titles and/or names for words that match a general, universal collection of commonly used words. These commonly used words are the general stopwords 119 that are ignored by standard search engines. The stopword inclusion search application 115 may determine the frequency of each of these words within the examined item names and/or titles. Upon examining the item titles and/or names that contain a predetermined number of words within databases associated with the selected search domain to determine the frequency of words that may be considered general stopwords 119, the stopword inclusion search application 115 proceeds to box 409.

In box 409, the stopword inclusion search application 115 includes a predetermined selection of the highest frequency of general stopwords 119 in the set of search rules 118 associated with the selected search domain. As such, the stopword inclusion search application 115 may be able to generate a list of stopwords 130 relevant to the particular search domain. Therefore, if a common word that is considered a general stopword 119 is not found to occur with any large frequency within the database, then that word would not be given any sort of special consideration and would be ignored as in a standard search. As such, it would not be included as a stopword 130 corresponding to a specific set of search rules 118. However, if there are certain words that are generally considered stopwords 130 that occur with a greater frequency within the item titles and/or names, the stopword inclusion search application 115, would possibly want to give some consideration to those words. Accordingly, the stopword inclusion search application 115 may want to include those words in the set of search rules 118.

For example, assume that the words "it," "be," and "a" are the three most general stopwords 119 found within item names and/or titles having less than four words. However, the words "but," "of," and "and" occur less frequently. The stopword inclusion search application 115 may decide to only select the three most common words to add to the list of stopwords 130 within the corresponding set of search rules 118. Therefore, the list of stopwords 130 would only include {"it," "be," "a"}. Accordingly, the words "but," "of," and "and" would not be included in the list and would essentially be ignored in search queries containing those words. Though this example illustrates the selection based on the top three words, the selection of stopwords 130 included in the set of search rules 118 may be based on a percentage of the highest frequency words, a maximum number of words, only the most frequent word, and/or any other approach to select at least a subset of the general stopwords 119 to include in the set of search rules 118. Additionally, some set of search rules 118 may not include a list of stopwords 130 and therefore, the stopword inclusion search application 115 would use consider the general stopwords 119. Upon including a predetermined selection of stopwords 130 found within the items names and/or titles in the set of search rules 118 associated with the selected search domain, the stopword inclusion search application 115 proceeds to box 412.

In box 412, the stopword inclusion search application 115 determines whether to create a list of stopwords 130 for another set of search rules 118. As previously discussed, each set of search rules 118 may be associated with a particular search domain. For each search domain, it may be appropriate to determine a list of stopwords 130 to apply to a search that is within a particular search domain. If the stopword inclusion search application 115 determines to create a list of stopwords 130 for another set of search rules 118, the stopword inclusion search application 115 proceeds to box 403. Otherwise, the portion of the stopword inclusion search application 115 ends.

Figure 5:
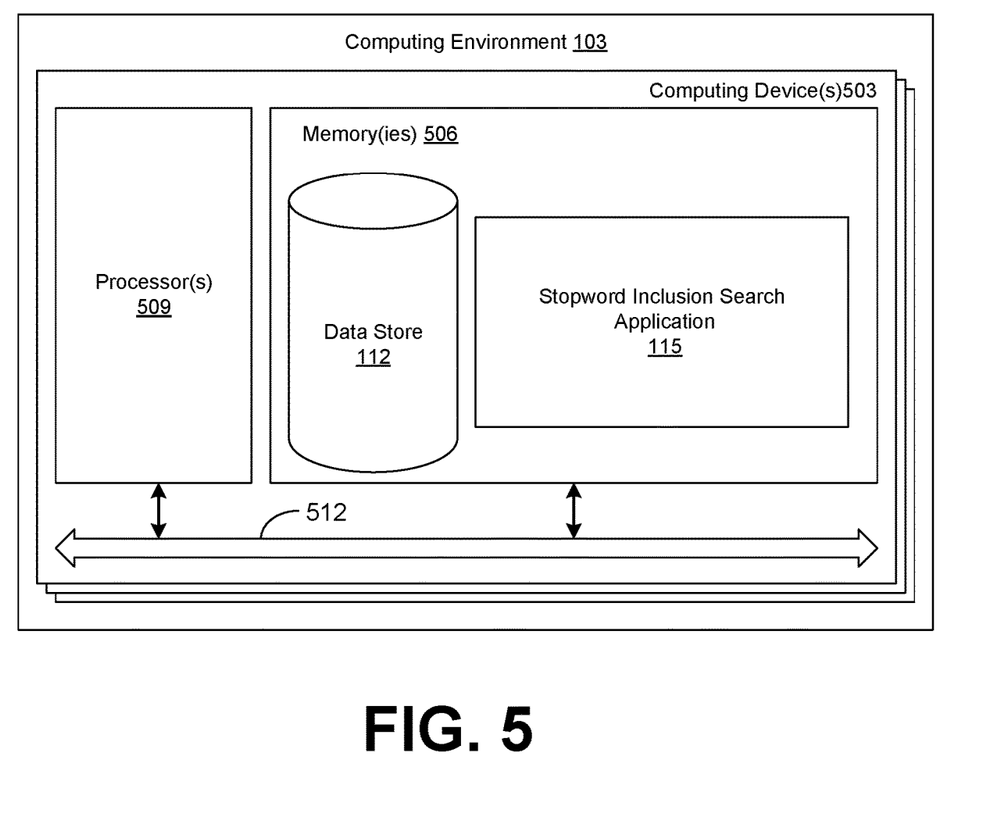
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 503. Each computing device 503 includes at least one processor circuit, for example, having a processor 509 and a memory 506, both of which are coupled to a local interface 512. To this end, each computing device 503 may comprise, for example, at least one server computer or like device. The local interface 512 may comprise, for example, a data bus with an accompanying address/control bus or other bus structure as can be appreciated.

Stored in the memory 506 are both data and several components that are executable by the processor 509. In particular, stored in the memory 506 and executable by the processor 509 are the stopword inclusion search application 115, and potentially other applications. Also stored in the memory 506 may be a data store 112 and other data. In addition, an operating system may be stored in the memory 506 and executable by the processor 509.

It is understood that there may be other applications that are stored in the memory 506 and are executable by the processor 509 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 506 and are executable by the processor 509. In this respect, the term "executable" means a program file that is in a form that can be ultimately be run by the processor 509. Examples of executable programs may be, for example, a compiled program that can be translated into machine code in a format that can be loaded into a random access portion of the memory 506 and run by the processor 509, source code that may be expressed in proper format such as object code that is capable of being loaded into a random access portion of the memory 506 and executed by the processor 509, or source code that may be interpreted by another executable program to generate instructions in a random access portion of the memory 506 to be executed by the processor 509, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 509 may represent multiple processors 509 and/or multiple processor cores and the memory 506 may represent multiple memories 506 that operate in parallel processing circuits, respectively. In such a case, the local interface 512 may be an appropriate network that facilitates communication between any two of the multiple processors 509, between any processor 509 and any of the memories 506, or between any two of the memories 506, etc. The local interface 512 may comprise additional systems designed to coordinate this communication, including, for example, performing load balancing. The processor 509 may be of electrical or of some other available construction.

Although the stopword inclusion search application 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the stopword inclusion search application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 509 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the stopword inclusion search application 115, that comprises software or code can be embodied in any non-transitory computer-readable medium for use by or in connection with an instruction execution system such as, for example, a processor 509 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   at least one application executable in the at least one computing device, wherein when executed, the at least one application causes the at least one computing device to at least:
   receive a search query from a client device;
   determine that the search term matches a particular type of term;
   assign a weight to a search term of the search query, the weight corresponding to an amount of consideration that will be applied to the search term when conducting a search associated with the search query, the weight decreasing as a quantity of search terms in the search query increase; and
   generate a search result based at least in part on the search term and the weight assigned to the search term.

2. The system of claim 1, wherein determining that the search term matches the particular type of term comprises comparing the search term with a plurality of predefined terms.

3. The system of claim 2, wherein the plurality of predefined terms comprise a plurality of stopwords.

4. The system of claim 1, wherein when executed, the at least one application causes the at least one computing device to at least determine a domain associated with the search query, the search result further being generated based at least in part on the domain.

5. The system of claim 1, wherein when executed, the at least one application causes the at least one computing device to at least determine the quantity of search terms in the search query.

6. The system of claim 1, wherein when executed, the at least one application causes the at least one computing device to at least select a search rule from a plurality of search rules, the weight being based at least in part on the search rule.

7. The system of claim 6, wherein the search rule is selected based at least in part on an interaction history of a user account of the client device.

8. A method, comprising:
   receiving, via at least one computing device, a search query from a client device;
   assigning, via the at least one computing device, a weight to a search term in the search query based at least in part on a search rule, the weight decreasing as a quantity of search terms in the search query increases; and
   generating, via the at least one computing device, a search result based at least in part on the weight and the search query.

9. The method of claim 8, further comprising determining a domain associated with the search query.

10. The method of claim 9, further comprising receiving a domain selection from the client device, the domain being determined based at least in part on the domain selection.

11. The method of claim 9, further comprising selecting the search rule from a plurality of search rules based at least in part on the domain.

12. The method of claim 8, wherein the search rule comprises a plurality of terms, and the weight is based at least in part on the search term matching a particular term in the plurality of terms.

13. The method of claim 12, wherein the plurality of terms comprise a plurality of stopwords.

14. The method of claim 8, wherein the search query comprises a first term and a second term, and first term is assigned a first weight, and the second term is assigned a second weight that differs from the first weight.

15. A system, comprising:
    at least one computing device; and
    at least one application executable in at least one computing device, wherein, when executed, the at least one application causes the at least one computing device to at least:

receive a search query from a client device; and generate a search result based at least in part on the search query and a weight assigned to a search term in the search query, the weight decreasing as a quantity of search terms in the search query increase.

16. The system of claim 15, wherein, when executed, the at least one application further causes the at least one computing device to at least determine a search rule associated with the search query based at least in part on a domain associated with the search query, the search result being based at least in part on the search rule.

17. The system of claim 15, wherein, when executed, the at least one application further causes the at least one computing device to at least compare the search term with a plurality of terms, the weight being based at least in part on the search term matching a particular term in the plurality of terms.

18. The system of claim 17, wherein, the plurality of terms comprise a plurality of stopwords.

19. The system of claim 17, wherein the plurality of terms are a subset of a plurality of general terms, and when executed, the at least one application further causes the at least one computing device to at least:

analyze a plurality of titles;

for individual general terms of the plurality of general terms, determine a frequency of occurrence in the plurality of titles; and select the subset of the plurality of general terms based at least in part on the frequency of occurrence.

20. The system of claim 15, wherein, when executed, the at least one application further causes the at least one computing device to at least transmit the search result to the client device.

* * * * *